(12) United States Patent
Hara

(10) Patent No.: US 8,098,954 B2
(45) Date of Patent: Jan. 17, 2012

(54) DISTORTED ABERRATION CORRECTION PROCESSING APPARATUS

(75) Inventor: Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 11/867,119

(22) Filed: Oct. 4, 2007

(65) Prior Publication Data

US 2008/0100929 A1   May 1, 2008

(30) Foreign Application Priority Data

Nov. 1, 2006  (JP) ................................. 2006-298213

(51) Int. Cl.
| | |
|---|---|
| G06K 9/00 | (2006.01) |
| G06K 9/34 | (2006.01) |
| G06K 9/20 | (2006.01) |
| G06K 9/36 | (2006.01) |
| G06K 9/40 | (2006.01) |
| G06K 9/32 | (2006.01) |
| H04N 5/225 | (2006.01) |
| H04N 9/04 | (2006.01) |
| H04N 5/228 | (2006.01) |
| H04N 5/14 | (2006.01) |
| H04N 9/64 | (2006.01) |
| H04N 9/74 | (2006.01) |

(52) U.S. Cl. ........ 382/275; 382/100; 382/173; 382/254; 382/274; 382/282; 382/293; 348/207.99; 348/207.1; 348/222.1; 348/571; 348/580; 348/720; 348/721

(58) Field of Classification Search .................. 382/100, 382/162, 173, 254–255, 274–276, 279, 282, 382/293, 295–299, 302–304, 307; 348/207.99, 348/207.1, 222.1, 571, 580, 720–721
See application file for complete search history.

(56) References Cited

U.S. PATENT DOCUMENTS 6,577,776 B1 *  6/2003  Hatalsky ....................... 382/276
2006/0092320 A1 *  5/2006  Nickerson et al. ............ 348/441

FOREIGN PATENT DOCUMENTS

| JP | 200-312327 A | 11/2000 |
|---|---|---|
| JP | 2004-362069 A | 12/2004 |

OTHER PUBLICATIONS

Wlnzker and Rabeler, "P-20: Electronic Image Correction for Projection Displays", SID 2002 Digest, ISSN/0002-0866x/02/3301-0272.*

The above references were cited in a Apr. 11, 2011 Japanese Office Action, which is not enclosed, that issued in Japanese Patent Application No. 2006-298213.

* cited by examiner

*Primary Examiner* — Anand Bhatnagar
*Assistant Examiner* — Nathan Bloom
(74) *Attorney, Agent, or Firm* — Cowan, Liebowitz & Latman, P.C.

(57) ABSTRACT

A distorted aberration correction processing apparatus includes DRAM and SRAM for storing an object image from an optical system. Further, the distorted aberration correction processing apparatus includes: a first address control circuit for reading out a pixel in the DRAM on a unit basis of an area including a plurality of the pixels along a curve corresponding to a distorted aberration of an optical system and writing the read-out pixel in SRAM; and a second address control circuit for reading out a pixel in the SRAM on a pixel basis and outputting the pixel read out on a pixel basis to an output portion so as to suppress the distorted aberration of the optical system. The first address control circuit effects control so that the signal of the areas is sequentially read out in a predetermined order, and the second address control circuit effects random access control.

2 Claims, 11 Drawing Sheets

FIG. 2
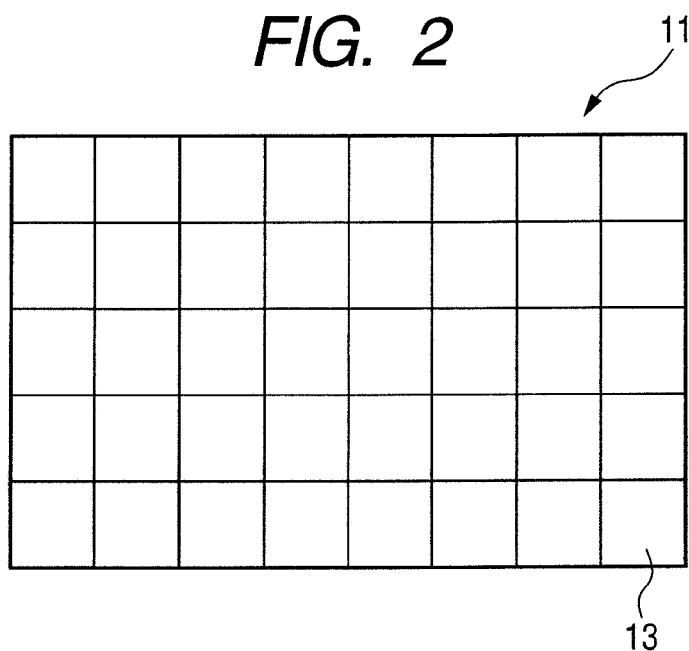
FIG. 3A
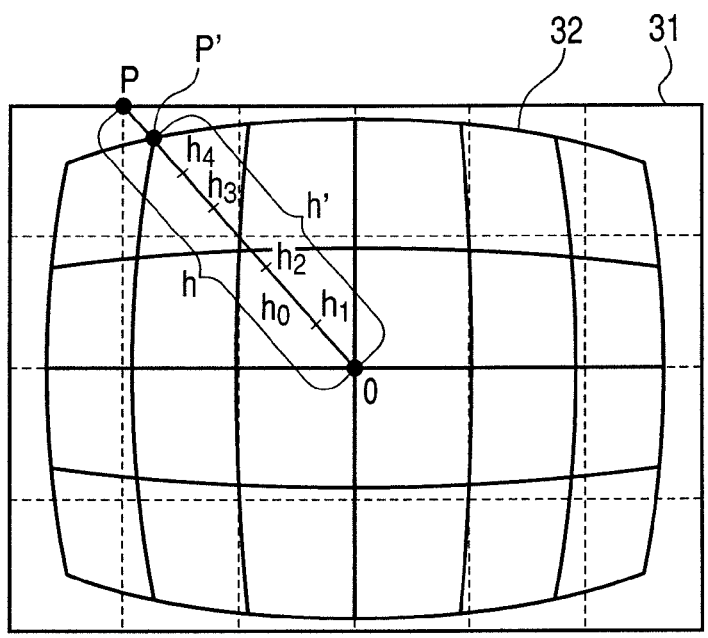
FIG. 3B
$$D(h) = \frac{h'}{h}$$

OUTPUT DIVISION UNIT

SRAM

DRAM

DRAM

SRAM

OUTPUT IMAGE

DISTORTED ABERRATION CORRECTION PROCESSING APPARATUS

BACKGROUND OF THE INVENTION

1. Field of the Invention

The present invention relates to a distorted aberration correction processing apparatus for correcting a distorted aberration of an optical system, and an image capture apparatus.

2. Description of the Related Art

Conventionally, because an optical system of an image capture apparatus has a distorted aberration, a problem has arisen that a captured image is deformed on its periphery. Whereas, there is a technology for correcting a distorted aberration by controlling address, according to the distorted aberration of an optical system of an image capture apparatus, so as to read out a pixel from memory along a curve corresponding to the distorted aberration (Japanese Patent Application Laid-Open No. H06-197261).

However, applying the technology disclosed in Japanese Patent Application Laid-Open No. H06-197261 to memory having a burst access function (hereinafter, called "burst access memory"), accesses to discontinuous addresses frequently take place, so that processing for address reconfiguration or burst stop may be required. Therefore, unfortunately, performance is considerably lowered.

Further, applying the technology described in Japanese Patent Application Laid-Open No. H06-197261 to memory without a burst access function (hereinafter, called "random access memory"), a problem has arisen that an access rate is lowered.

SUMMARY OF THE INVENTION

It is an aspect of the present invention to provide distorted aberration correction of an optical system while preventing an access rate of memory from being lowered.

To achieve the object described above, according to an aspect of the present invention, a distorted aberration correction processing apparatus comprises: a first memory area; a second memory area; a first address control circuit for reading out an image signal in the first memory area on a unit basis of an area including a plurality of the image signals along a curve corresponding to a distorted aberration of an optical system, and writing the image signal read out on the area basis in the second memory area; and a second address control circuit for reading out an image signal in the second memory area on a pixel signal basis and outputting the image signal read out on the pixel signal basis to an output portion so as to suppress the distorted aberration of the optical system, wherein the first address control circuit effects control so that the image signal read out on the area basis is sequentially read out in a predetermined order, and the second address control circuit effects random access control.

According to another aspect of the present invention, an image capture apparatus comprises: an optical system; a photoelectric conversion device for picking up an object image; a first memory area for storing an image signal from the photoelectric conversion device; a second memory area; a first address control circuit for reading out an image signal in the first memory area on a unit basis of area including a plurality of the image signals along a curve corresponding to a distorted aberration of the optical system, and writing the image signal read out on the area basis in the second memory area; and a second address control circuit for reading out an image signal in the second memory area on a pixel signal basis and outputting the image signal read out on the pixel signal basis to an output portion so as to suppress the distorted aberration of the optical system, wherein the first address control circuit effects so that the signal read out on the area basis is sequentially read out in a predetermined order, and the second address control circuit effects random access control.

Another objects and features of the present invention will be made apparent from the following description and the accompanying drawings.

BRIEF DESCRIPTION OF THE DRAWINGS

FIG. 2 is a view illustrating an output image divided in a lattice pattern.

FIGS. 3A and 3B are views for describing a calculation method for a distortion ratio.

DESCRIPTION OF THE EMBODIMENTS

Now, exemplary embodiments of the present invention will be hereinafter described in detail with reference to the accompanying drawings. The exemplary embodiments of the present invention use a random access memory area smaller than a burst access memory area for storing an image to be subjected to correction. A correction of distorted aberration is performed on the image to be subjected to correction by reading out a part of the image to be subjected to correction from the burst access memory area on a unit basis of an area including a plurality of pixels, transferring the read-out part to the random access memory area and randomly accessing the random access memory area. In transferring to the random access memory area, the area read out from the burst access memory area has a width enough to be accessed in a burst access manner and an address allowing for readout in an address increment mode is specified.

First Embodiment

Figure 1:
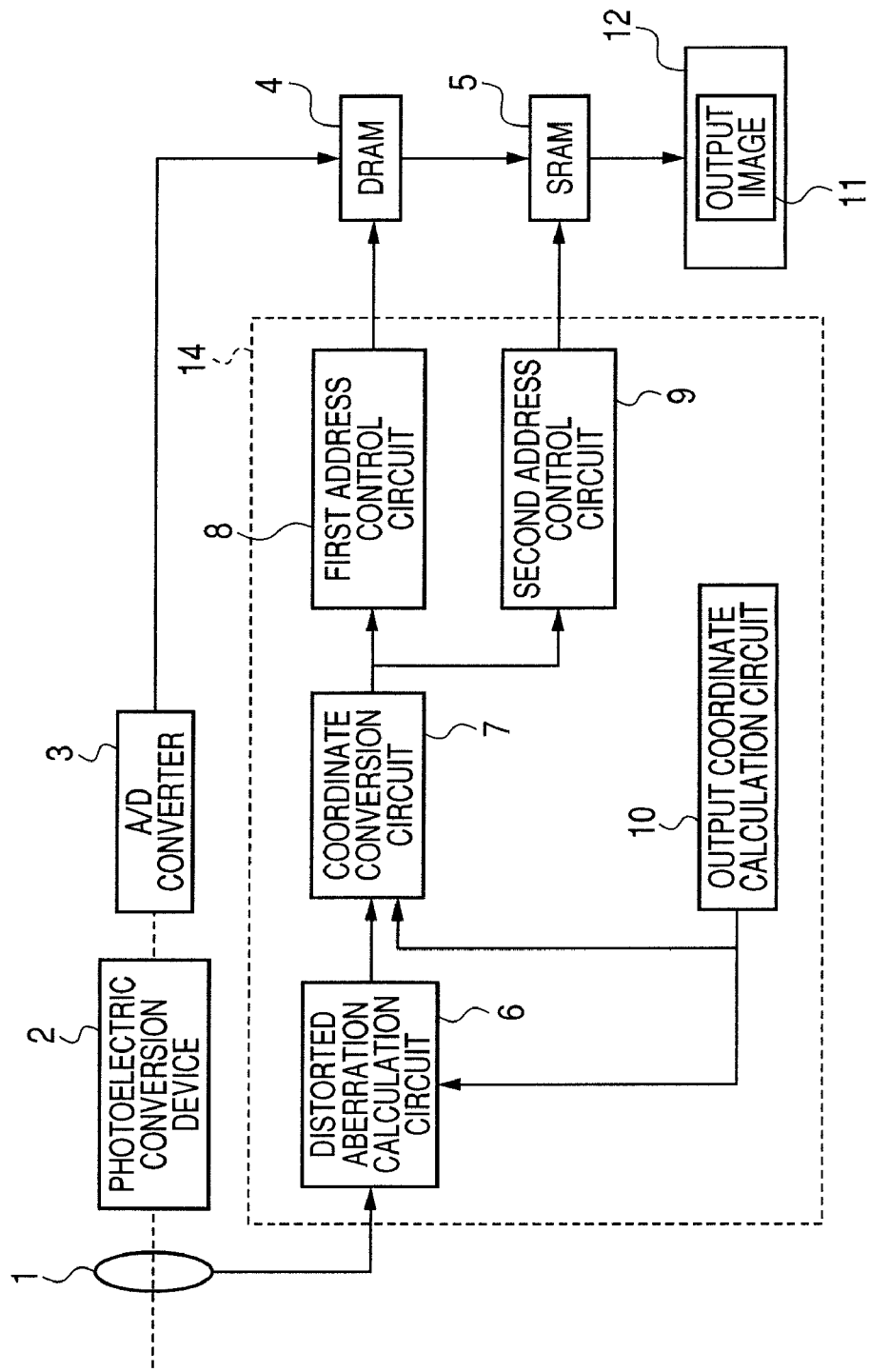
FIG. 1 is a block diagram illustrating a rough configuration of an image capture system according to a first exemplary embodiment of the present invention.

FIG. 1 is a block diagram illustrating a rough configuration of an image capture system according to a first exemplary embodiment of the present invention. The image capture system according to the present invention includes a lens system 1 and an image capture apparatus. The image capture apparatus includes: a photoelectric conversion device 2; an A/D converter 3; DRAM 4; SRAM 5; and a distorted aberration correction processing apparatus 14. The distorted aberration correction processing apparatus 14 includes: a distorted aberration calculation circuit 6; a coordinate conversion circuit 7; a first address control circuit 8; a second address conversion circuit 9; and an output coordinate calculation circuit 10.

The lens system 1 serves as an optical system. This lens system 1 includes at least one lens and converges light incident from the side of an object. The photoelectric conversion device 2 converts light which passed through the lens system 1 into an electrical signal. The A/D converter 3 converts the electrical signal into a digital signal, which was converted by the photoelectric conversion device 2. DRAM 4 serves as a burst access memory and stores the digital signal provided by the A/D converter 3 as an input image. Here, the term "burst access" means an access method that when a signal is read out line-sequentially (in a predetermined order) from a first position to a second position in memory, a start point (the position of an area at which the signal to be read at the beginning is stored) and a length (the number of words from the area in which the signal to be read at the beginning is stored, to an area at which readout ends) are specified.

The output coordinate calculation circuit 10 is an output coordinate calculation circuit for calculating an output coordinate of an output portion 12. The distorted aberration calculation circuit 6 calculates a distortion ratio at the output coordinate provided by the output coordinate calculation circuit 10, based on distorted aberration data of the lens system 1 acquired in advance. The coordinate conversion circuit 7 converts the output coordinate provided by the output coordinate calculation circuit 10 into an input coordinate corresponding to the distortion ratio.

An output image 11, as shown in FIG. 2, is supplied to the output portion 12 on a unit basis of a unit 13 divided in a lattice pattern (hereinafter, called "output division unit"). The first address control circuit 8 calculates an address in DRAM 4 of a rectangular area in an input image 12 including the output division unit 13, as described below. The second address control circuit 9 calculates a coordinate in SRAM 5 corresponding to an output coordinate in a rectangular area read out into SRAM 5.

The distorted aberration calculation circuit 6, the coordinate conversion circuit 7 and the first address control circuit 8, at the time of storing one frame's input image in DRAM 4, transfer a part of the input image in DRAM 4 to SRAM 5. The coordinate conversion circuit 7 and the second address control circuit 9, at the time of completion of the transfer to SRAM 5, convert addresses of all pixels in the output division unit 13 and output pixel values in SRAM 5 to the output portion 12.

FIGS. 3A and 3B are views for describing a calculation method for the distortion ratio. FIG. 3A is a view illustrating the relation between an output coordinate 31 and an input coordinate 32. The input coordinate 32 is distorted by the distorted aberration of the lens system 1. A point O corresponds to a position of an optical axis of the input image. A point P is situated on the output coordinate 31. A point P' is a point in the input coordinate 32 corresponding to the point P. A height of image at the point P is designated by h. A height of image at the point P' is designated by h'. In addition, the point P' is obtained from the following expression 1:

$$h\sqrt{(P_x-O_x)^2+(P_y-O_y)^2}$$

$$P=(P_x, P_y)$$

$$O=(O_x, O_y)$$

$$P'=(O_x+D(h)\cdot P_x, O_y+D(h)\cdot P_y)$$

FIG. 3B is an expression for expressing a distortion ratio D(h) at a height of image h. An amount of distortion ratios at all pixels of an output image become enormous if retained, but a data volume to be retained can be reduced by retaining distortion ratios at a part of the pixels of the output image and interpolating therebetween. Now, a specific example will be hereinafter described as one example thereof.

Figure 4:
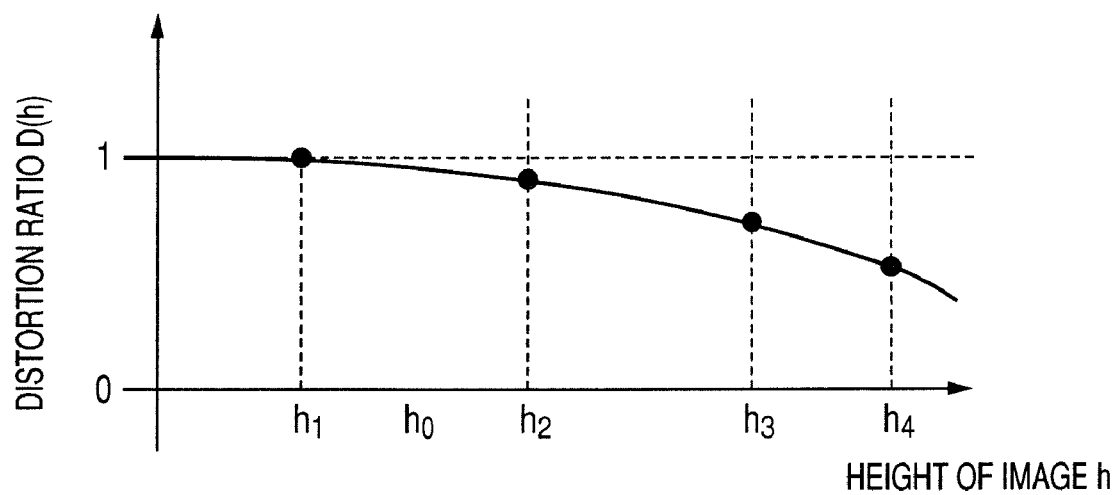
FIG. 4 is a view illustrating a distortion ratio corresponding to a height of image in a distorted aberration of a barrel shape.

FIG. 4 is a view illustrating a distortion ratio corresponding to a height of image in a distorted aberration of a barrel shape. The horizontal axis shows a height of image h and the longitudinal axis shows a distortion ratio D(h) at the height of image h. In FIG. 4, four distortion ratios h1, h2, h3 and h4 are retained. A distortion ratio at the height of image other than the four distortion ratios can be obtained from interpolation. For example, the height of image h0 in FIG. 4 can be obtained from interpolation using the distortion ratios at h1 and h2. In addition, in FIG. 4, the four distortion ratios are retained, but the number of distortion ratios to be retained is not limited to this.

As described above, the input coordinate 32 corresponding to the output coordinate 31 can be obtained. Processing for obtaining the input coordinate 32 corresponding to the output coordinate 31 is hereinafter called "coordinate transformation".

Figure 5A:
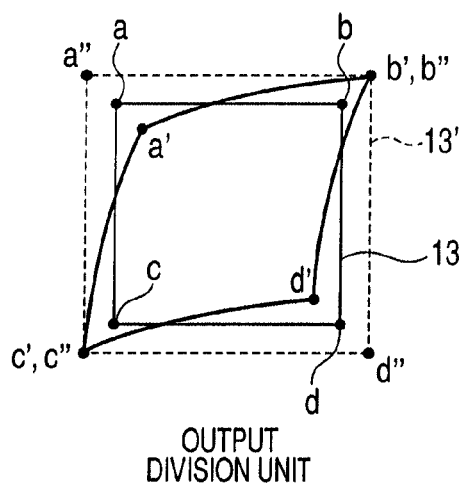
FIGS. 5A, 5B and 5C are views illustrating an area read out in an output image, DRAM and SRAM.
Figure 5B:
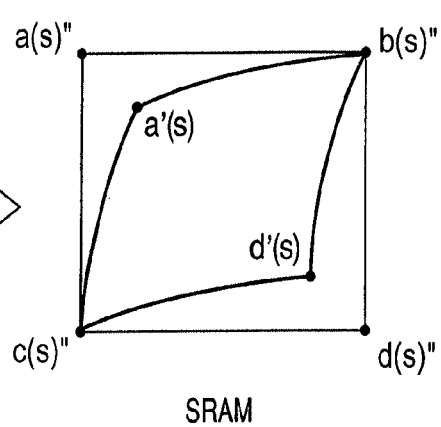
Figure 5C:
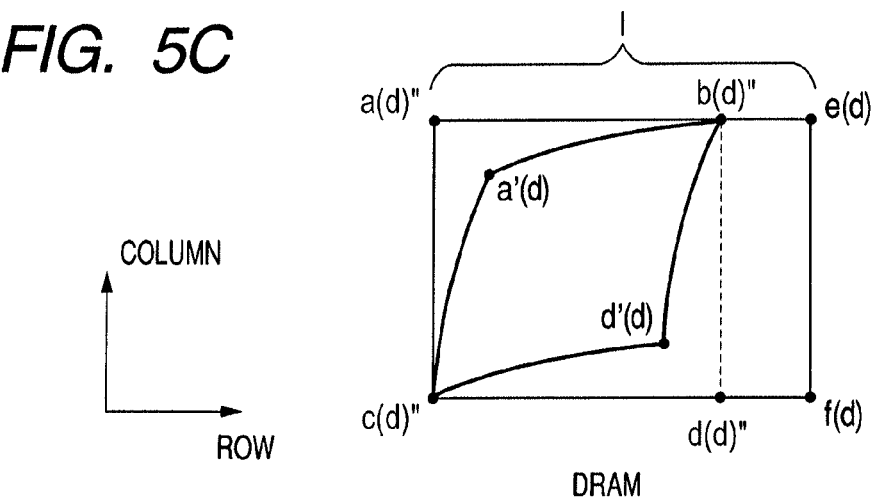

Coordinate transformation, as shown in FIGS. 5A, 5B and 5C, is performed on the output division unit 13 basis. First, as shown in FIG. 5A, four corners a, b, c and d of the output division unit 13 are converted into input coordinates a', b', c' and d' by coordinate transformation on the basis of distorted aberration data of the lens system 1 acquired in advance. Then, a minimum rectangular area including the input coordinates a', b', c' and d' is obtained and four corners obtained are denoted by a", b", c" and d", respectively.

FIG. 5B shows that the coordinates a", b", c", d", a' and d' shown in FIG. 5A are shown by coordinates in SRAM 5. Coordinates a(s)", b(s)", c(s)" and d(s)" correspond to the coordinates a", b", c" and d", respectively, and coordinates a(s)' and d(s)' correspond to the coordinates a' and d', respectively. An area surrounded by a(s)", b(s)", c(s)" and d(s)" corresponds to an area read out from SRAM 5. Accordingly, a size of the output division unit 13 is preferably set so that the area surrounded by a(s)", b(s)", c(s)" and d(s)" does not exceed the maximum capacity of SRAM.

FIG. 5C shows that the coordinates a(s)", b(s)", c(s)", d(s)", a(s)" and d(s)" shown in FIG. 5B are designated by coordinates in DRAM 4. Coordinates a(d)", b(d)", c(d)" and d(d)" correspond to the coordinates a(s)", b(s)", c(s)" and d(s)", respectively, and coordinates a(d)" and d(d)" correspond to the coordinates a(s)" and d(s)", respectively. The upper left-hand side coordinate a(d)" is an address at which DRAM 4 starts to be read (hereinafter, called "DRAM readout start address"), and a width 1 of a rectangular area including a(s)", b(s)", c(s)", d(s)", a(s)" and d(s)" is changed to an integer multiple nBL of a burst length BL (n is an integer of one or more). As the result, the rectangular area is extended in the row direction and has coordinates a(d)", c(d)", e(d) and f(d).

For example, assuming that DRAM 4 with the burst length BL=2, 4, 8 being available is used, and information about one pixel can be stored at one address of DRAM 4. In this case, the width 1 of the rectangular area is changed to be a multiple of 2 which is the minimum value of the burst length. When the number of pixels existing in the width 1 of the rectangular area is expressed by a binary number, respective digits thereof are denoted by b0, b1, b2, . . . in order from LSB to the MSB. Then, because of the multiple of 2, b0 is fixed to 0, b1 is the number of times of use of BL=2 (1 or 0), b2 is the number of times of use of BL=4 (1 or 0), and b3 or the digit of upper place than b3 is the number of times of use of BL=8 (0 or more).

In DRAM 4 shown in FIG. 5C, a DRAM readout area a(d)", c(d)", e(d) and f(d) is read out. Then, in SRAM 5 shown in FIG. 5B, writing at a(s)", c(s)", b(s)" and d(s)" is carried out, and output pixels are read out from SRAM 5. That is, the area a(d)", c(d)", b(d)" and d(d)" in DRAM 4 is written in SRAM 5, but an area b(d)", d(d)", e(d) and f(d) is not written. Coordinate transformation is performed for obtaining a coordinate position in DRAM 4, and further a coordinate in DRAM 4 may be also transformed into a coordinate in SRAM 5 by retaining the coordinate a(d)" in DRAM 4 corresponding to an upper left part of a rectangular image in SRAM 5.

Figure 6A:
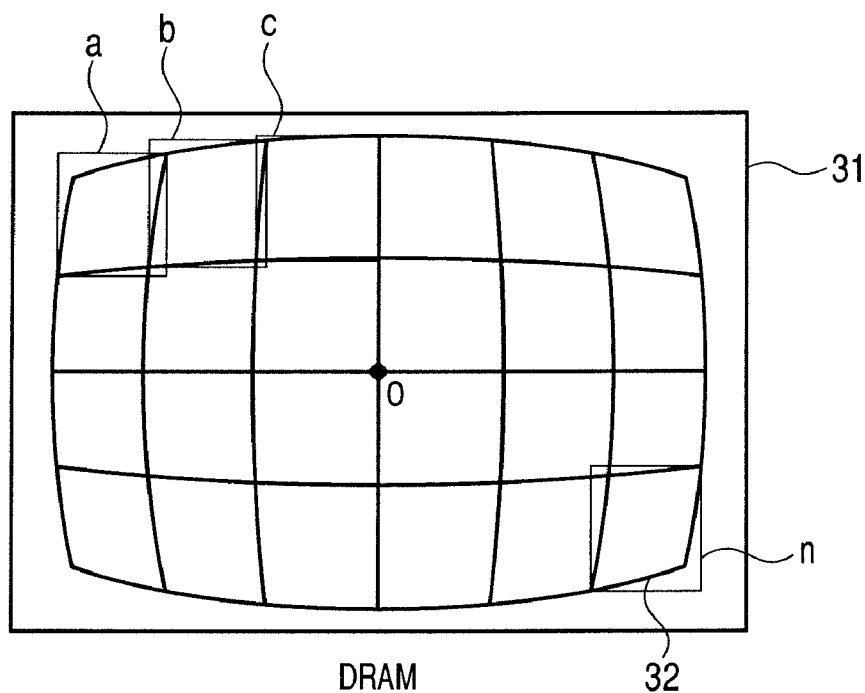
FIGS. 6A, 6B and 6C are views illustrating processing for storing an image in DRAM and SRAM.
Figure 6B:
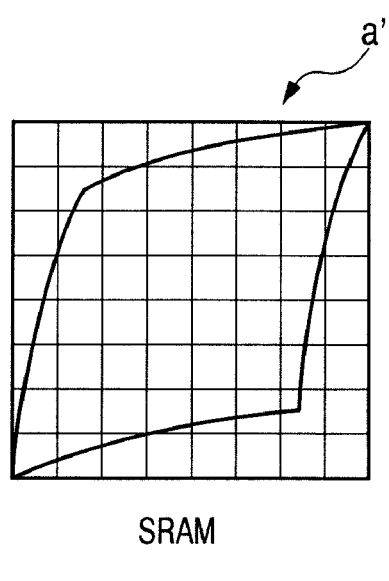

Now, processing for storing an image in DRAM 4 and SRAM 5 will be described with reference to FIGS. 6A to 6C. FIG. 6A is a view illustrating readout operation in DRAM 4, and FIG. 6B is a view illustrating readout operation in SRAM 5.

As shown in FIG. 6A, in DRAM 4, readout operation is carried out in the burst access manner on a unit basis of each of rectangular areas a, b, c, ... n, which has a width of an integer multiple of the burst length BL, along the distorted aberration of the lens system 1. For example, a rectangular area a' is selected in SRAM 5 as an area which is desired to be output to the output image 11, and a rectangular area a is determined based on the distorted aberration data as a readout point in DRAM 4 corresponding to the rectangular area a'. Then, the rectangular area a in DRAM 4 is written in SRAM 5. Then, output operation from SRAM 5, as shown in FIG. 6B, is carried out in the random access manner on a pixel basis along a curve corresponding to the distorted aberration of the lens system 1. In SRAM 5, since the image signal is read out on the pixel basis readout operation is carried out in a finer manner than in DRAM 4 along the curve corresponding to the distorted aberration of the lens system 1. As shown in FIG. 6C, after completion of outputting the rectangular area a' from SRAM 5, a rectangular area b' is selected as an area which is desired to be subsequently output to the output image 11. A rectangular area b is determined based on the distorted aberration data as a readout position in DRAM 4 corresponding to this rectangular area b'. Then, the rectangular area b in DRAM 4 is written in SRAM 5. After this rectangular area b is output from SRAM 5, a rectangular area c' is selected as an area which is desired to be subsequently output to the output image 11. A rectangular area c is determined based on the distorted aberration data as a readout position in DRAM 4 corresponding to this rectangular area c'. Then, the rectangular area c in DRAM 4 is written in SRAM 5.

Thereafter, readout operation from DRAM 4, writing operation in SRAM 5 and output operation from SRAM 5 are similarly carried out.

Figure 7:
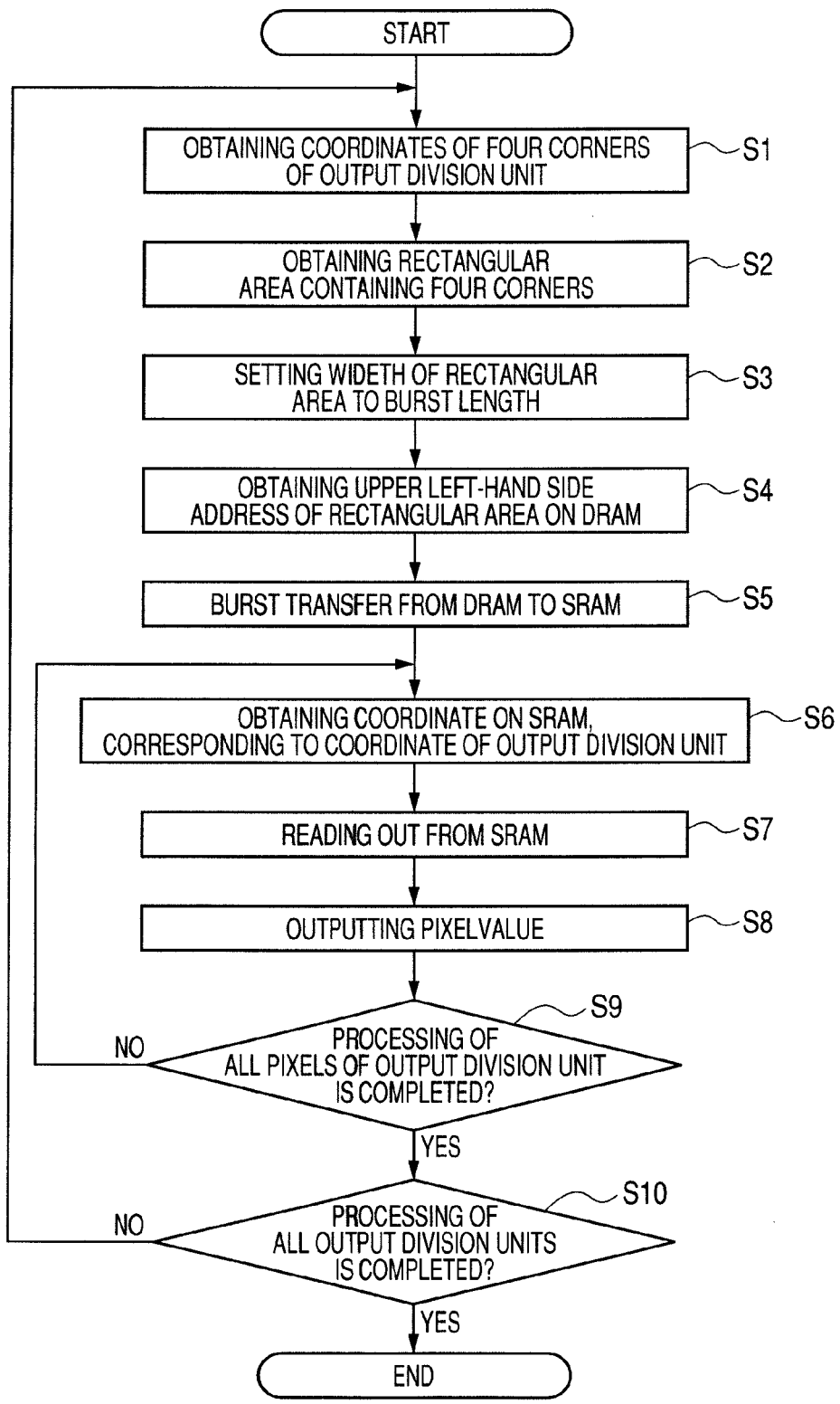
FIG. 7 is a block diagram illustrating a control flow for an image capture apparatus and an image capture system according to the present embodiment.

FIG. 7 is a block diagram illustrating a control flow for an image capture apparatus and an image capture system according to the present embodiment. Processing for distorted aberration correction is carried out on the unit basis of output division unit 13 of the output image 11.

At step S1, the first address control circuit 8 provides an input coordinate corresponding to four corners of the output division unit 13.

At step S2, the first address control circuit 8 provides a rectangle including the four points in the input coordinate obtained in step S1.

At step S3, when a width of the rectangle obtained in step S2 is not an integer multiple of the burst length of DRAM 4, the first address control circuit 8 changes the width to an integral multiple of the burst length.

At step S4, the first address control circuit 8 calculates an address in DRAM 4 corresponding to an upper left-hand side coordinate of the rectangle obtained in step S2.

At step S5, DRAM 4 is read out in the burst transfer mode at the address in the DRAM 4 obtained in step S4 and is transferred to SRAM 5.

After step S6, a part of an image in SRAM 5 transferred in step S5 will be processed.

At step S6, the second address control circuit 9 provides a coordinate in SRAM 5 corresponding to the coordinate of the output division unit 13.

At step S7, SRAM 5 is read out by converting the coordinate in DRAM 4 obtained in step S6 into an address in SRAM 5. At this time, as required, interpolation using a peripheral pixel is carried out.

At step S8, a pixel value read out in step S7 is output from SRAM 5.

At step S9, processing for the steps from step 6 is repeated until all pixels in the output division unit 13 are processed.

At step S10, processing for the steps from step 1 is repeated to correct the distorted aberration until all the output division units 13 in the output image 11 are processed.

According to the present embodiment, because of readout of DRAM in the burst access manner, the number of occurrences of address reconfiguration is smaller than that in the random access manner. Further, because SRAM is read out in the random access manner, the distorted aberration of the optical system can be corrected finer.

Second Embodiment

Figure 8:
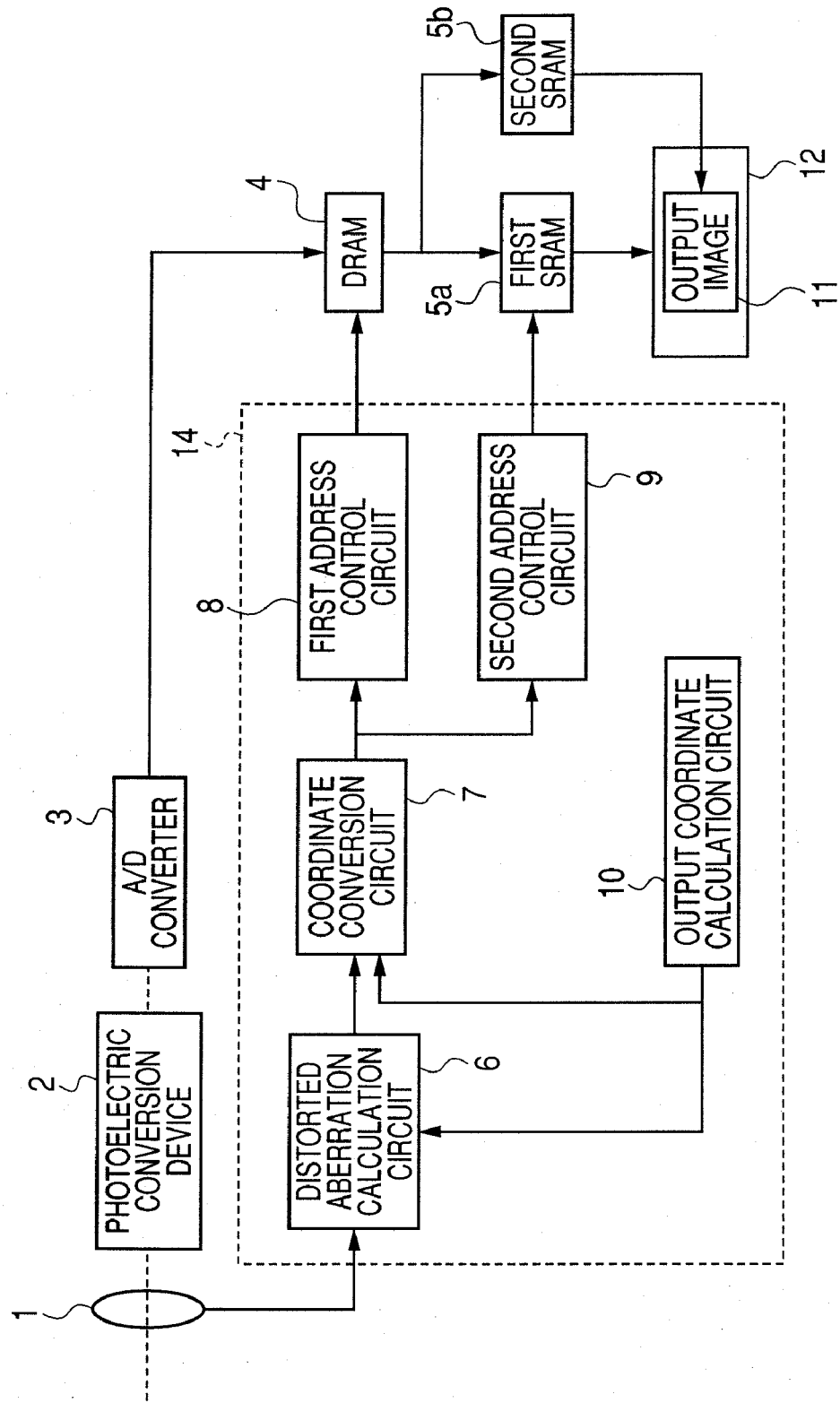
FIG. 8 is a block diagram illustrating a rough configuration of an image capture system according to a second exemplary embodiment of the present invention.

FIG. 8 is a block diagram illustrating a rough configuration of an image capture system according to a second exemplary embodiment of the present invention. The coordinate transformation part and the part relative to readout of DRAM 4 are similar to the first embodiment, but including two banks of SRAM, i.e. a first SRAM 5a and a second SRAM 5b makes a difference from the first embodiment.

In the present embodiment, while the first SRAM 5a is read out and a first output division unit is output, a rectangular area in DRAM 4 corresponding to a second output division unit is read out and stored in the second SRAM 5b. While the second SRAM 5b is read out and the second output division unit is output, a rectangular area in DRAM 4 corresponding to a third output division unit is read out and stored in the first SRAM 5a. According to the second embodiment, compared to the configuration of the first embodiment, waiting time is shorter.

Figure 6C:
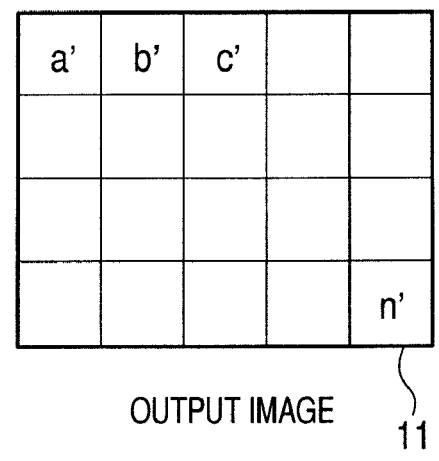

Also in the second embodiment, as shown in FIGS. 6A, 6B and 6C, DRAM 4 is read out in the burst access manner and SRAM 5 is read out in the random access manner.

Figure 9:
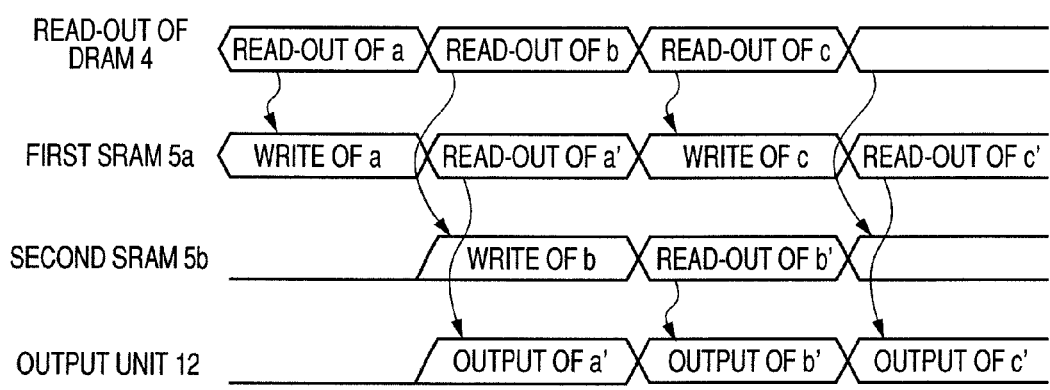
FIG. 9 is a timing diagram of read operation and writing operation in the second embodiment.

FIG. 9 is a timing diagram of read operation and writing operation in the second embodiment. First, concerning DRAM 4, a rectangular area a' is selected in SRAM 5 as an area which is desired to be output to the output image 11, and a rectangular area a is determined based on the distorted aberration data as a read position in DRAM 4 corresponding to the rectangular area a'. Then, the rectangular area a in DRAM 4 is written in the first SRAM 5a. After completion of writing in the first SRAM 5a, a rectangular area b' is selected as an area which is desired to be subsequently output to the output image 11. A rectangular area b is determined based on the distorted aberration data as a read position in DRAM 4 corresponding to this rectangular area b'. Then, the rectangular area b in DRAM 4 is written in the second SRAM 5b. While the rectangular area b in DRAM 4 is written in the second SRAM 5b, the rectangular area a' is output from the first SRAM 5*a* to the output portion 12. In a step of completion of both of processing of writing the rectangular area b from DRAM 4 and processing of outputting the rectangular area a' to the output portion 12, a rectangular area c' is selected as an area which is desired to be subsequently output to the output image 11. A rectangular area c is determined based on the distorted aberration data as a read position in DRAM 4 corresponding to this rectangular area c'. Then, the rectangular area c in DRAM 4 is written in the first SRAM 5*a*. Then, while the rectangular area c is written from DRAM 4, the rectangular area b' is output from the second SRAM 5*b* to the output portion 12.

Thereafter, similarly, writing in the first SRAM 5*a* and the second SRAM 5*b* from DRAM 4 and outputting from SRAM 5 are carried out. As described above, by writing in one of the SRAMs from DRAM and outputting from the other SRAM, a time waiting for processing can be controlled to the minimum.

Third Embodiment

Figure 10:
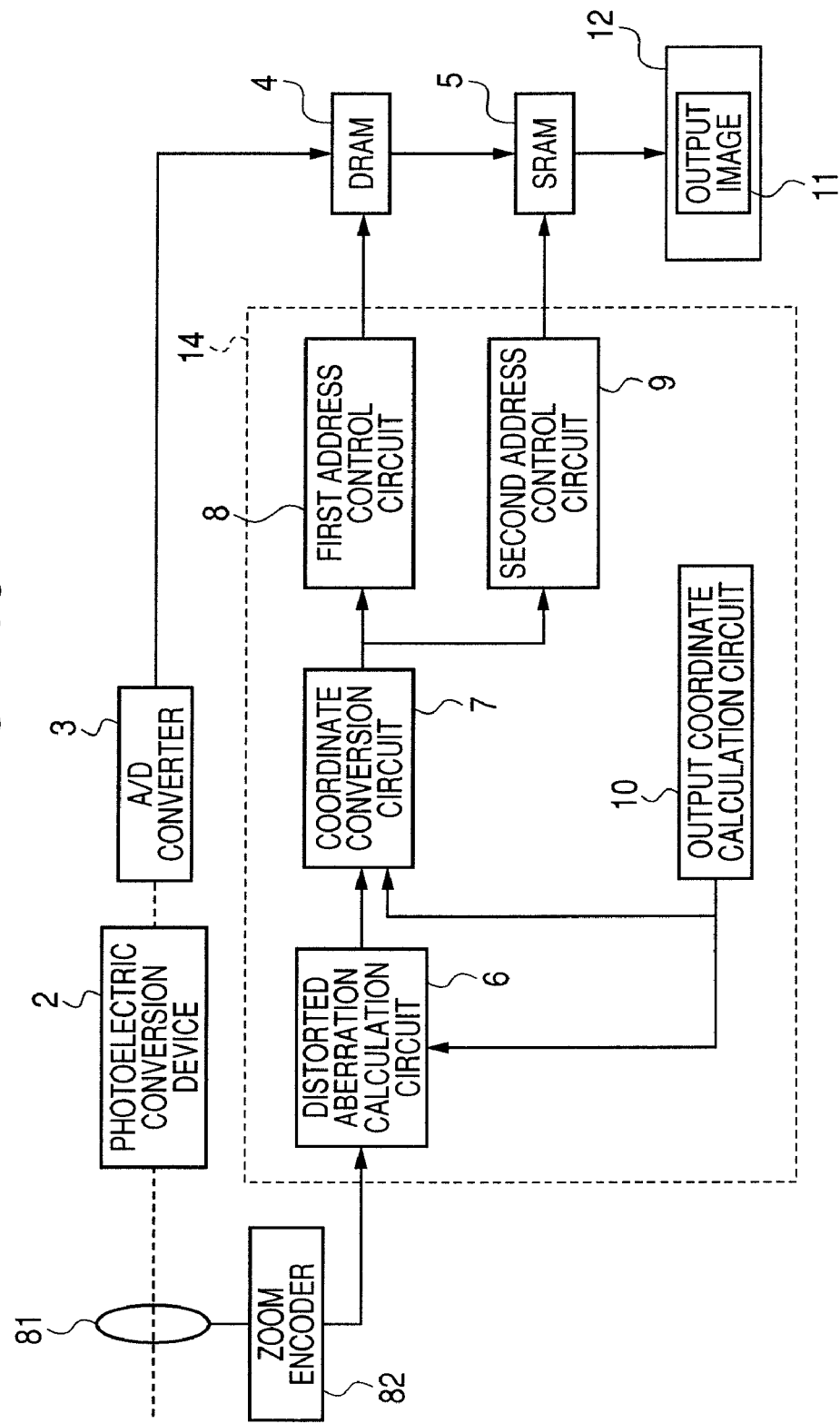
FIG. 10 is a block diagram illustrating a rough configuration of an image capture system according to a third exemplary embodiment of the present invention.
Figure 11:
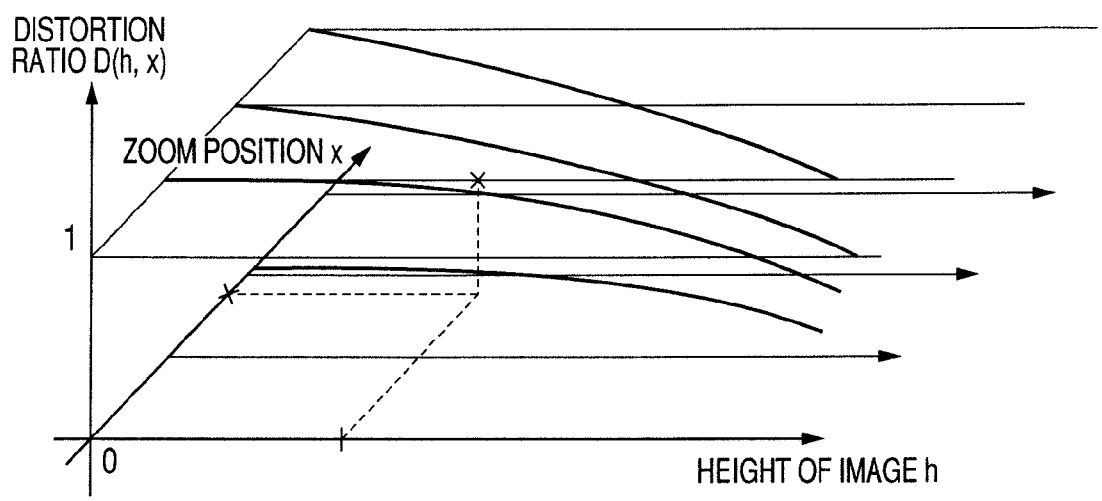
FIG. 11 is a view illustrating a distortion ratio corresponding to a zoom position and a height of image.

FIG. 10 is a block diagram illustrating a rough configuration of an image capture system according to a third exemplary embodiment of the present invention. The configuration except the lens system is similar to that of the second embodiment. A plurality of lenses constituting a lens system 1 includes a zoom lens 81, and a zoom encoder 82 is mounted. A distorted aberration calculation circuit 6 retains a distortion ratio as shown in FIG. 11 at a plurality of zoom positions. In FIG. 11, a distortion ratio D(h, x) is obtained from a height of image h and the zoom position x. Similarly to FIG. 4, at an intermediate zoom position or height of image, the distortion ratio can be obtained from interpolation based on the distorted aberration data at zoom positions in front of and behind the position which have the distorted aberration data.

Fourth Embodiment

Figure 12:
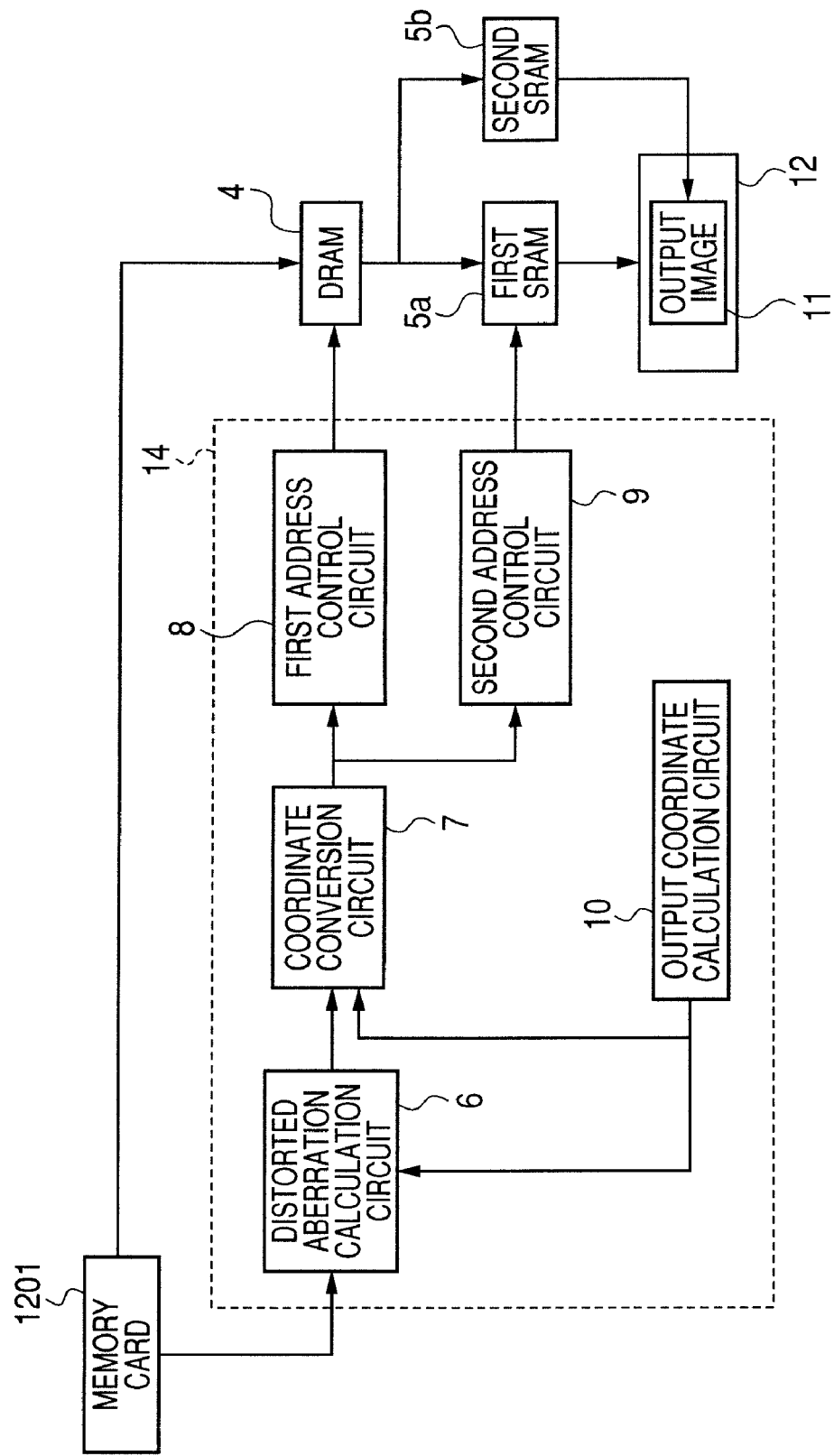
FIG. 12 is a block diagram illustrating a rough configuration of an image capture system according to a fourth exemplary embodiment of the present invention.

FIG. 12 is a block diagram illustrating a rough configuration of an image capture system according to a fourth exemplary embodiment of the present invention. The present embodiment, roughly, has a configuration similar to that of the second embodiment, but it is different in correction of a distorted aberration of an image recorded on a memory card 1201 (image data about an image taken by a lens whose distortion is known is recorded, which is obtained through a photoelectric conversion device and an A/D converter). In the present embodiment, the image recorded on the memory card 1201 and distorted aberration data of the image recorded on the memory card 1201 are read out into DRAM 4, and the image having the distorted aberration is processed to correct the distorted aberration thereof, similarly to the second embodiment.

In addition, in the first to fourth embodiments described above, DRAM is used as one example of the burst access memory and SRAM is used as one example of the random access memory. However, these are only one example of exemplary embodiments of the present invention. Therefore, the present invention is not limited to these, and another memory may be used.

Further, in the first to fourth embodiments described above, the burst access memory and the random access memory are separately implemented, which is, also, only one example of exemplary embodiments of the present invention. Therefore, the present invention is not limited to this, and, for example, one memory may be divided into a first memory area for burst access and a second memory area for random access to use.

Incidentally, it is needless to say that the objects of the present invention are also achieved by supplying a storage medium, which records a program code of software that can implement the functions of the above-mentioned exemplary embodiments to a system or an apparatus, that is, by reading out and executing the program code stored in the storage medium by a computer (or a CPU or MPU) of the system or the apparatus. In this case, the program code itself read out from the storage medium implements the functions of the above-mentioned exemplary embodiments, and the storage medium which stores the program code constitutes the present invention.

As the storage medium for supplying the program code, for example, a flexible disk, a hard disk, an optical disk, a magneto-optical disk, a CD-ROM, a CD-R, a magnetic tape, a nonvolatile semiconductor memory card, a ROM, and the like may be used. Further, there is a possibility that the functions of the above-mentioned exemplary embodiments can be implemented when the computer executes the read program code.

Further, it is needless to say that the present invention includes a case where the functions of the above-mentioned exemplary embodiments are implemented by some or all of actual processing operations executed by an OS (operating system) running on the computer based on an instruction of the program code.

Furthermore, it is needless to say that the present invention also includes a case where the functions of the above-mentioned exemplary embodiments are implemented by some or all of actual processing operations executed by a CPU or the like arranged in a function extension board or a function extension unit, which inserted in or connected to the computer, after the program code read out from the storage medium is written in the memory of the extension board or unit.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-298213 filed on Nov. 1, 2006, which is hereby incorporated by reference herein.

What is claimed is:

1. A distorted aberration correction processing apparatus, comprising:
a first memory for storing an input image, said first memory being burst-accessible;
a second memory, said second memory being random-accessible;
an output coordinate calculation circuit which selects a plurality of coordinates of a rectangular area of an output image;
a distorted aberration calculation circuit which obtains a distortion ratio at each of the coordinates selected by the output coordinate calculation circuit;
a coordinate conversion circuit which obtains the coordinates of the input image stored in the first memory corresponding to the plurality of coordinates selected by the output coordinate calculation circuit, on the basis of the distortion ratio obtained by the distorted aberration calculation circuit;
a first address control circuit which burst accesses the first memory to read out therefrom an image of a first rectangular area of the input image stored in the first memory and writes, into the second memory, an image included in only a second rectangular area which is a partial area of the first rectangular area and has a smaller size than the first rectangular area;

a second address control circuit which random-accesses the coordinates of the area written in the second memory by the first address control circuit, corresponding to the plurality of coordinates selected by the output coordinate calculation circuit, to read out an image corresponding to the plurality of coordinates selected by the output coordinate calculation circuit; and an output control circuit which generates the output image by controlling the output coordinate calculation circuit, the distortion aberration calculation circuit, the coordinate conversion circuit, the first address control circuit and the second address control circuit so as to repeatedly operate together until all the coordinates of the output image are selected, wherein, the first address control circuit controls read-out address of the first memory and write addresses of the second memory such that the first rectangular area includes all the coordinates obtained by the coordinate conversion circuit and has a lateral size which is an integer times as long as a burst length of the first memory, and the second rectangular area includes all the coordinates obtained by the coordinate conversion circuit.

2. An image capture apparatus, comprising:

an optical system;

an image pickup element which receives light incident through the optical system and converts the received light into electrical signals;

a first memory for storing an input image, said first memory being burst-accessible;

a second memory, said second memory being random-accessible;

an output coordinate calculation circuit which selects a plurality of coordinates of a rectangular area of an output image;

a distorted aberration calculation circuit which obtains a distortion ratio at each of the coordinates selected by the output coordinate calculation circuit;

a coordinate conversion circuit which obtains the coordinates of the input image stored in the first memory corresponding to the plurality of coordinates selected by the output coordinate calculation circuit, on the basis of the distortion ratio obtained by the distorted aberration calculation circuit;

a first address control circuit which burst accesses the first memory to read out therefrom an image of a first rectangular area of the input image stored in the first memory and writes, into the second memory, an image included in only a second rectangular area which is a partial area of the first rectangular area and has a smaller size than the first rectangular area; and a second address control circuit which random-accesses the coordinates of the area written in the second memory by the first address control circuit, corresponding to the plurality of coordinates selected by the output coordinate calculation circuit, to read out an image corresponding to the plurality of coordinates selected by the output coordinate calculation circuit; and an output control circuit which generates the output image by controlling the output coordinate calculation circuit, the distortion aberration calculation circuit, the coordinate conversion circuit, the first address control circuit and the second address control circuit so as to repeatedly operate together until all the coordinates of the output image are selected, wherein, the first address control circuit controls read-out address of the first memory and write addresses of the second memory such that the first rectangular area includes all the coordinates obtained by the coordinate conversion circuit and has a lateral size which is an integer times as long as a burst length of the first memory, and the second rectangular area includes all the coordinates obtained by the coordinate conversion circuit.

* * * * *